United States Patent
Saitoh et al.

[11] Patent Number: 6,140,412
[45] Date of Patent: Oct. 31, 2000

[54] WATERPROOFING AGENT FOR INK JET PRINTING PAPER

[75] Inventors: Tohru Saitoh; Mitsuru Sasaki, both of Fukui, Japan

[73] Assignee: Nicca Chemical Co., Ltd., Fukui, Japan

[21] Appl. No.: 09/287,041

[22] Filed: Apr. 6, 1999

Related U.S. Application Data

[63] Continuation-in-part of application No. 08/906,594, Aug. 5, 1997, abandoned.

[30] Foreign Application Priority Data

Sep. 12, 1996 [JP] Japan ..................................... 8-241704

[51] Int. Cl.$^7$ ................................ C08J 3/00; C08K 3/20; C08L 75/00; D21H 11/00; D21H 13/00
[52] U.S. Cl. ....................... 524/591; 162/135; 162/164.6; 428/425.1; 524/839; 524/840
[58] Field of Search ..................................... 524/591, 839, 524/840; 428/425.1; 162/135, 164.6

[56] References Cited

U.S. PATENT DOCUMENTS

| | | | |
|---|---|---|---|
| 3,971,764 | 7/1976 | Schürmann et al. | |
| 4,293,474 | 10/1981 | Dieterich et al. | 260/29.2 TN |
| 4,305,858 | 12/1981 | Reischl | 260/29.2 TN |
| 5,561,187 | 10/1996 | Bechara et al. | 524/591 |

FOREIGN PATENT DOCUMENTS

| | | |
|---|---|---|
| 0 165 150 | 12/1985 | European Pat. Off. . |
| 2 322 236 | 3/1977 | France . |

*Primary Examiner*—Patrick D. Niland
*Attorney, Agent, or Firm*—Reed Smith Shaw & McClay LLP

[57] ABSTRACT

A waterproofing agent for ink jet printing paper comprising an aqueous cationic polyurethane resin solution prepared by dispersing or dissolving in water one or more types of cationic polyurethane resins obtained by neutralizing with acid or quaternizing with a quaternizing agent part or all of the tertiary amino groups of a polyurethane molecule obtained by isocyanate polyaddition reaction of a polyol with at least 2 active hydrogen atoms which can react with isocyanate groups and with a weight average molecular weight of 300–5000, a diol, triol, diamine or triamine compound with a tertiary amino group and a weight average molecular weight of less than 300, and an organic isocyanate with at least 2 isocyanate groups.

17 Claims, No Drawings

WATERPROOFING AGENT FOR INK JET PRINTING PAPER

CROSS-REFERENCE TO RELATED APPLICATIONS

This application is a continuation-in-part of application Ser. No. 08/906,594, filed Aug. 5, 1997, now abandoned.

BACKGROUND OF THE INVENTION

1. Field of the Invention

The present invention relates to a waterproofing agent for ink jet printing paper. In particular, the invention relates to a waterproofing agent for ink jet printing paper which is able to improve the water resistance of images and characters printed on printing paper, eliminate virtually all color tone change, eliminate virtually all yellowing of blank sections, and give printing paper with low ink blotching, when it is mixed with pulp fiber into a slurry for sheet making, or impregnated or coated onto plain paper or coated paper.

2. Description of the Related Art

Ink jet printing is characterized by requiring no step of development and fixation, employing simple printing apparatuses and using plain paper or coated paper, while also facilitating coloring and allowing both printing of images and character graphics, and for these reasons it is rapidly becoming more widely used and is expected to be useful in the future. When plain paper is used for ink jet printing, problems generally occur such as blotching of the dye upon contact with moisture after printing, and therefore the use of waterproofing agents has been investigated. Known waterproofing agents include cationic resins such as dicyandiamide condensates, polyamines and polyethyleneimines, but these have presented such problems as poor water resistance, color tone changes, yellowing of blank areas and ink blotching, and therefore waterproofing agents have been sought which have satisfactory water resistance, and which produce no change in color tone or yellowing of blank areas, and no ink blotching.

SUMMARY OF THE INVENTION

It is an object of the present invention to provide a waterproofing agent for ink jet printing paper which is able to improve the water resistance of images and characters printed on printing paper, eliminate virtually all color tone change, eliminate virtually all yellowing of blank areas and minimize ink blotching, by treating plain paper or coated paper with an aqueous cationic polyurethane resin solution.

As a result of diligent research aimed at overcoming the problems described above, the present inventors have completed the present invention upon the finding that by using a cationic polyurethane resin as the waterproofing agent for printing paper it is possible to improve the water resistance, eliminate virtually all color tone change, eliminate virtually all yellowing of blank areas and minimize ink blotching.

In other words, the present invention provides a waterproofing agent for ink jet printing paper which comprises an aqueous cationic polyurethane resin solution prepared by dispersing or dissolving in water one or more cationic polyurethane resins obtained by neutralizing with acid or quaternizing with a quaternizing agent part or all of the tertiary amino groups of a polyurethane molecule obtained by isocyanate polyaddition reaction of the following compounds (A), (B) and (C):

(A) a polyol with at least 2 active hydrogen atoms which can react with isocyanate groups and which has a weight average molecular weight of 300–5000;

(B) a diol, triol, diamine or triamine compound with a tertiary amino group and a weight average molecular weight of less than 300, and;

(C) an organic isocyanate with at least 2 isocyanate groups.

DESCRIPTION OF THE PREFERRED EMBODIMENTS

As the polyol of (A) above to be used according to the invention there may be mentioned, for example, polyester polyols, polyether polyols, polycarbonate polyols, polyacetal polyols, polyacrylate polyols, polyesteramide polyols and polythioether polyols.

As polyester polyols there may be mentioned, for example, polyesters obtained by dehydrogenation condensation reaction of a glycol component comprising one or more compounds selected from the group consisting of ethylene glycol, propylene glycol, 1,3-propanediol, 1,4-butanediol, 1,5-pentanediol, 3-methyl-1,5-pentanediol, 1,6-hexanediol, neopentylglycol diol, diethylene glycol, triethylene glycol, tetraethylene glycol, polyethylene glycol of molecular weight 300–1000, dipropylene glycol, tripropylene glycol, bishydroxyethoxybenzene, 1,4-cyclohexanedimethanol, bisphenol A, bisphenol S, hydrogenated bisphenol A, hydroxyquinone and an alkylene oxide addition product, with an acid component comprising one or more compounds selected from the group consisting of malonic acid, succinic acid, glutaric acid, adipic acid, pimelic acid, suberic acid, azelaic acid, sebacic acid, hendecanedicarboxylic acid, decanedicarboxylic acid, dodecanedicarboxylic acid, maleic anhydride, fumaric acid, 1,3-cyclopentanedicarboxylic acid, terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyldicarboxylic acid, 1,2-bisphenoxyethane-p,p'-dicarboxylic acid, or a dicarboxylic anhydride or ester-forming derivative, as well as polyesters obtained by ring-opening polymerization reaction of a cyclic ester compound such as ε-caprolactone, and copolymerized polyesters thereof.

As polyether polyols there may be mentioned, for example, those obtained by addition polymerization of a compound with at least 2 active hydrogens, such as ethylene glycol, diethylene glycol, triethylene glycol, propylene glycol, trimethylene glycol, 1,3-butanediol, 1,4-butanediol, 1,5-pentanediol, 1,6-hexanediol, neopentylglycol, glycerine, trimethylolethane, trimethylol propane, sorbitol, sucrose, bisphenol A, bisphenol S, hydrogenated bisphenol A, aconitic acid, trimellitic acid, hemimellitic acid, phosphoric acid, ethylenediamine, diethylenetriamine, triisopropanolamine, pyrogallol, dihydroxybenzoic acid, hydroxyphthalic acid or 1,2,3-propanetrithiol, by a common method using at least one or more monomers such as ethylene oxide, propylene oxide, butylene oxide, styrene oxide, epichlorohydrin, tetrahydrofuran or cyclohexylene as the initiator.

As polycarbonate polyols there may be mentioned, for example, compounds obtained by reacting a glycol such as 1,4-butanediol, 1,6-hexanediol or diethylene glycol with diphenylcarbonate and phosgene.

As the polyol of (A) there may be used a compound obtained by common addition polymerization of one or more monomers such as ethylene oxide, propylene oxide, butylene oxide, styrene oxide, epichlorohydrin, tetrahydrofuran or cyclohexylene, using as the initiator a compound with at least 2 primary amino groups, such as ethylenediamine or propylene diamine.

As the compound of (B) to be used according to the invention there may be mentioned, for example, compounds represented by the following general formula:

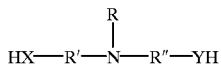

wherein X and Y may be the same or different and each represent —NH— or —O—, R represents an alkyl group, alkanol group or aminoalkyl group of 1–4 carbon atoms, and R' and R" may be the same or different and each represent an alkylene group of 1–4 carbon atoms. Among such compounds, there may be mentioned N-methyl-N,N-diethanolamine, N-ethyl-N,N-diethanolamine and N-isobutyl-N,N-diethanolamine as diol compounds (X and Y are —O— and R is an alkyl group), and triethanolamine as a triol compound (X and Y are —O— and R is an alkanol group). There may also be mentioned methyliminobispropylamine and butyliminobispropylamine as diamine compounds (X and Y are —NH— and R is an alkyl group), and tri(2-aminoethyl)amine as a triamine compound (X and Y are —NH— and R is an aminoalkyl group).

As the organic isocyanate compound of (C) to be used according to the invention there may be mentioned, for example, 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, xylylene diisocyanate, tetramethylxylylene diisocyanate, hydrogenated xylylene diisocyanate, lysine diisocyanate, isophorone diisocyanate and 4,4'-dicyclohexylmethane diisocyanate.

Useful polyurethane resins according to the invention may be preferably produced by reacting (A), (B) and (C) in a ratio of equivalents of the organic isocyanate of (C) to total equivalents of hydroxyl groups of the polyol compound of (A) and equivalents of hydroxyl groups and primary amino groups of the diol, triol, diamine or triamine compound of (B), of 1.0/1.0–1.0/0.5, and preferably 1.0/0.9–1.0/0.6. If this proportion is greater than 1.0/1.0, slightly inferior water resistance results. If it is not at least 1.0/0.5, isocyanate groups are present which do not take part in the reaction, resulting in production of water-insoluble white powdery compounds. In addition, from the standpoint of reducing the production time for the isocyanate polyaddition reaction, a tin-based catalyst and/or amine-based catalyst is also preferably used. As such tin-based catalysts there may be mentioned dibutyltin dilaurate and stannous octoate, and as amine-based catalysts there may be mentioned triethylenediamine, triethylamine, tetramethylpropanediamine, tetramethylbutanediamine and N-methylmorpholine.

The isocyanate polyaddition reaction may be carried out in the absence of a solvent depending on the composition, but it is generally carried out using as the reaction solvent a hydrophilic organic solvent which does not directly contribute to the isocyanate polyaddition reaction system, for control of the reaction system or control of the base viscosity. As such hydrophilic organic solvents there may be mentioned ketones such as acetone, methyl ethyl ketone, methyl isobutyl ketone and diisobutyl ketone, organic acid esters such as methyl formate, ethyl formate, propyl formate, butyl formate, methyl acetate, ethyl acetate, propyl acetate, butyl acetate, methyl propionate, ethyl propionate and butyl propionate, and amines such as N,N-dimethylformamide and N-methylpyrrolidone. It is preferred for the hydrophilic organic solvent used to be removed at the final stage.

The waterproofing agent for ink jet printing paper according to the invention may be obtained by dispersing or dissolving in water a cationic polyurethane resin obtained by neutralizing with acid or quaternizing with a quaternizing agent a portion or all of the tertiary amino groups in the polyurethane molecule obtained by the polyaddition reaction of (A), (B) and (C), and then reacting the unreacted isocyanate groups with water in the presence of water in an amount of not less than 220 parts by weight per 100 parts by weight of the cationic polyurethane resin. As acids to be used here there may be mentioned organic acids such as formic acid, acetic acid, propionic acid, butyric acid, lactic acid, malic acid and citric acid, and inorganic acids such as hydrochloric acid, phosphoric acid, phosphorous acid and nitric acid. As quaternizing agents there may be mentioned epoxy compounds such as ethylene oxide, propylene oxide, butylene oxide, styrene oxide and epichlorohydrin, sulfuric compounds such as dimethylsulfuric acid, diethylsulfuric acid and methyl p-toluenesulfonate, and alkyl halides such as methyl chloride, ethyl chloride, benzyl chloride, methyl bromide and ethyl bromide. The weight average molecular weight of the resulting cationic polyurethane resin will depend on the reaction conditions, but is preferred to be 2000–50,000.

For improved stability of the product, a hydrophilic organic solvent may be added as a diluting solvent to the waterproofing agent for ink jet printing paper according to the present invention, after reaction between the unreacted isocyanate groups and the excess water. As hydrophilic organic solvents useful for this purpose there may be mentioned alcohols such as methyl alcohol, ethyl alcohol, propyl alcohol, isopropyl alcohol, n-butyl alcohol, sec-butyl alcohol, tert-butyl alcohol, isobutyl alcohol, pentyl alcohol, hexyl alcohol, heptyl alcohol, octyl alcohol, nonyl alcohol, decyl alcohol, undecyl alcohol and dodecyl alcohol; phenols such as phenol and cresol; glycol ethers such as 3-methyl-3-methoxybutanol, 3-methyl-3-methoxybutyl acetate, ethyleneglycol monomethylether, ethyleneglycol monoethylether, ethyleneglycol monobutylether, ethyleneglycol ethylether acetate, diethyleneglycol monomethylether, diethyleneglycol monoethylether, diethyleneglycol monobutylether, diethyleneglycol monohexylether, diethyleneglycol mono-n-hexylether, diethyleneglycol dibutylether, dipropyleneglycol monoethylether, dipropyleneglycol monopropylether, dipropyleneglycol monobutylether and tripropyleneglycol monomethylether; and glycols such as ethylene glycol, propylene glycol, 1,3-butanediol, hexylene glycol, diethylene glycol and dipropylene glycol.

The waterproofing agent for ink jet printing paper according to the invention which has thus been obtained is used to coat plain paper or coated paper. The coating amount of the waterproofing agent for ink jet printing paper is preferably 0.1–10.0 g/m$^2$, and especially 0.2–5.0 g/m$^2$, in terms of the cationic polyurethane resin component.

A concrete method for using the waterproofing agent for ink jet printing paper according to the invention may be mixing the waterproofing agent with pulp fiber into a slurry for sheet making, and while commonly used wood pulp is the major type of pulp fiber, other fiber substances which may also be used include synthetic pulp, synthetic fibers and glass fibers. The waterproofing agent may also be used to prepare a treatment solution, impregnating plain paper or coated paper with the solution and removing the excess impregnating solution from the front and back of the plain paper or coated paper and then drying the paper, for which specific means may include a size press. There may also be mentioned methods wherein commonly used binders or inorganic or organic pigments are mixed therewith, and the plain paper or coated paper is coated with an air knife coater, roll coater, blade coater, bar coater, brush coater, champlex coater or gravure coater, and then dried. As binders there may be mentioned oxidized starch and polyvinyl alcohol. As inorganic pigments there may be mentioned precipitated calcium carbonate, heavy calcium carbonate, kaolin (white clay), talc, calcium sulfate, barium sulfate, titanium oxide, zinc oxide, zinc sulfate, zinc carbonate, satin white, aluminum silicate, diatomaceous earth, calcium silicate, synthetic silica, aluminum hydroxide, alumina and lithophone. As organic pigments there may be mentioned styrene-based plastic pigments, acrylic-based plastic pigments, microcapsules and urea resin pigments.

When the aforementioned waterproofing agent for ink jet printing paper is used, staining mordants, foaming agents, dispersing agents, thickeners, coloring agents, antistatic agents, preservatives, water-soluble resins and adhesives may optionally be used therewith. As staining mordants there may be mentioned dicyandiamide condensates, polyamines and polyethyleneimines. As water-soluble resins and adhesives there may be mentioned oxidized starch, etherized starch, carboxymethylcellulose, hydroxyethylcellulose and other cellulose derivatives, casein, gelatin, soybean protein, polyvinyl alcohol and their derivatives, aqueous adhesives such as maleic anhydride resins, styrene-butadiene copolymers, methyl methacrylate-butadiene copolymers and other conjugated diene-based polymer latexes, polymers or copolymers of acrylic acid esters and methacrylic acid esters and other acrylic-based polymer latexes, ethylene-vinyl acetate copolymers and other vinyl-based polymer latexes, melamine resins and urea resins and other heat curing resins, as well as polymethacrylate, polyurethane resins, unsaturated polyester resins, vinyl chloride-vinyl acetate copolymer, polyvinylacetal, alkyl resins and other thermoplastic resins, any of which may be used alone or in a desired combination.

Here, "plain paper" refers to any commonly used acid paper or neutral paper, and "coated paper" refers to coated paper coated with one of the aforementioned binders and inorganic or organic pigments.

When printing with water-based ink onto ink jet printing paper which has been treated with the waterproofing agent for ink jet printing paper according to the invention, the dye in the water-based ink bonds with the cationic polyurethane resin in the printing paper, thus preventing elution of the dye and improving the water resistance. Water-based ink used for this purpose usually contains at least one type of anionic direct dye or acid dye, and additionally contains a moistening agent, dye solvent, preservative, etc.

As examples of commonly used direct dyes there may be mentioned C.I. Direct Black 2, 4, 9, 11, 14, 17, 19, 22, 27, 32, 36, 38, 41, 48, 49, 51, 56, 62, 71, 74, 75, 77, 78, 80, 105, 106, 107, 108, 112, 113, 117, 132, 146, 154, 194, C.I. Direct Yellow 1, 2, 4, 8, 11, 12, 24, 25, 26, 27, 28, 33, 34, 39, 41, 42, 44, 48, 50, 51, 58, 72, 85, 86, 87, 88, 98, 100, 110, C.I. Direct Orange 3, 8, 10, 26, 29, 39, 41, 49, 51, 102, C.I. Direct Red 1, 2, 4, 8, 9, 11, 13, 17, 18, 20, 23, 24, 28, 31, 33, 37, 39, 44, 46, 47, 48, 51, 59, 62, 63, 73, 75, 77, 80, 81, 83, 84, 85, 90, 94, 99, 101, 108, 110, 145, 189, 197, 220, 224, 225, 226, 227, 230, C.I. Direct Violet 1, 7. 9, 12, 35, 48, 51, 90, 94, C.I. Direct Blue 1, 2, 6, 8, 15, 22, 25, 34, 69, 70, 71, 72, 75, 76, 78, 80, 81, 82, 83, 86, 90, 98, 106, 108, 110, 120, 123, 158, 163, 165, 192, 193, 194, 195, 196, 199, 200, 201, 202, 203, 207, 218, 236, 237, 239, 246, 258, C.I. Direct Green 1, 6, 8, 28, 33, 37, 63, 64, C.I. Direct Brown 1, 2, 6, 25, 27, 44, 58, 95, 100, 101, 106, 112, 173, 194, 195, 209, 210, 211, etc.

As examples of acid dyes there may be mentioned C.I. Acid Black 1, 2, 7, 15, 17, 24, 26, 28, 31, 41, 48, 52, 60, 63, 94, 107. 109. 112, 118, 119, 121, 122, 131, 155, 156, C.I. Acid Yellow 1, 3, 4, 7, 11, 12, 13, 14, 17, 18, 19, 23, 25, 29, 34, 36, 38, 40, 41, 42, 44, 49, 53, 55, 59, 61, 71, 72, 76, 78, 99, 111, 114, 116, 122, 135, 161, 172, C.I. Acid Orange 7, 8, 10, 33, 56, 64, C.I. Acid Red 1, 4, 6, 8, 13, 14, 15, 18, 19, 21, 26, 27, 30, 32, 34, 35, 37, 40, 42, 51, 52, 54, 57, 80, 82, 83, 85, 87, 88, 89, 92, 94, 97, 106, 108, 110, 115, 119, 129, 131, 133, 134, 135, 154, 155, 172, 176, 180, 184, 186, 187, 249, 254, 256, 317, 318, C.I. Acid Violet 7, 11, 15, 34, 35, 41, 43, 49, 75, C.I. Acid Blue 1, 7, 9, 22, 23, 25, 27, 29, 40, 41, 43, 45, 49, 51, 53, 55, 56, 59, 62, 78, 80, 81, 83, 90, 92, 93, 102, 104, 111, 113, 117, 120, 124, 126, 145, 167, 171, 175, 183, 229, 234, 236, C.I. Acid Green 3, 12, 19, 27, 41, C.I. Acid Brown 4, 14, etc.

The present invention will now be further illustrated by way of the following examples which, however, are in no way intended to restrict the invention. Unless otherwise specified, the term "parts" in the examples refers to parts by weight.

EXAMPLE 1
(Synthesis by prepolymer method)

Into a nitrogen-purged one-liter 4-necked flask there were charged 68.0 parts of a polyether polyol with a weight average molecular weight of 561 consisting of an addition polymer of bisphenol A and propylene oxide (tradename: Adeca Polyether BPX-33, product of Asahi Electrical Industries, KK.), 10.0 parts of N,N-dimethylformamide and 81.4 parts of hexamethylene diisocyanate, and these were reacted at 70–90° C. for about 2–5 hours to obtain a composition with an NCO content of 19.2%. After cooling to under 50° C., 28.8 parts of N-methyl-N,N-diethanolamine was added to the resulting composition, and further reaction at 70–90° C. for about 2–5 hours yielded a urethane prepolymer with an NCO content of 5.4%. To this urethane prepolymer there was added 22.0 parts of 99% acetic acid as an acid, and after mixing to uniformity, 789.8 parts of water was added over a period to make a uniform solution. Reaction between the unreacted isocyanate groups and the water begins from the initial dissolution, but to ensure complete reaction between the unreacted isocyanate groups and the water, the reaction was continued at 20–50° C. for 2–5 hours to yield an aqueous cationic polyurethane resin solution.

The equivalent ratio of NCO/OH at this time was 1.0/0.75.

The weight average molecular weight of the resulting cationic polyurethane resin was 3,200.

The appearance of the aqueous cationic polyurethane resin solution obtained in this manner was a white hazy to white cloudy liquid, and the non-volatile portion was 18.1%.

EXAMPLE 2
(Synthesis by prepolymer method)

Into a nitrogen-purged one-liter 4-necked flask there were charged 84.0 parts of a polyether polyol with a weight average molecular weight of 790 consisting of an addition polymer of bisphenol A and propylene oxide (tradename: Adeca Polyether BPX-55, product of Asahi Electrical Industries, KK.), 10.0 parts of N,N-dimethylformamide and 71.5 parts of hexamethylene diisocyanate, and these were reacted at 70–90° C. for about 2–5 hours to obtain a composition with an NCO content of 16.2%. After cooling to under 50° C., 25.3 parts of N-methyl-N,N-diethanolamine was added to the resulting composition, and further reaction at 70–90° C. for about 2–5 hours yielded a urethane prepolymer with an NCO content of 4.7%. To this urethane prepolymer there was added 19.3 parts of 99% acetic acid as an acid, and after mixing to uniformity, 789.8 parts of water was added over a period to make a uniform solution. Reaction between the unreacted isocyanate groups and the water begins from the initial dissolution, but to ensure complete reaction between the unreacted isocyanate groups and the water, the reaction was continued at 20–50° C. for 2–5 hours to yield an aqueous cationic polyurethane resin solution.

The equivalent ratio of NCO/OH at this time was 1.0/0.75.

The weight average molecular weight of the resulting cationic polyurethane resin was 3,500.

The appearance of the aqueous cationic polyurethane resin solution obtained in this manner was a white hazy to white cloudy liquid, and the non-volatile portion was 17.9%.

EXAMPLE 3
(Synthesis by prepolymer method)

Into a nitrogen-purged one-liter 4-necked flask there were charged 69.8 parts of a polyether polyol with a weight average molecular weight of 584 consisting of an addition polymer of bisphenol S and propylene oxide (molar ratio: 1.0/6.6), 10.0 parts of N,N-dimethylformamide and 80.3 parts of hexamethylene diisocyanate, and these were reacted at 70–90° C. for about 2–5 hours to obtain a composition with an NCO content of 18.8%. After cooling to under 50° C., 28.4 parts of N-methyl-N,N-diethanolamine was added to the resulting composition, and further reaction at 70–90° C. for about 2–5 hours yielded a urethane prepolymer with an NCO content of 5.3%. To this urethane prepolymer there was added 21.7 parts of 99% acetic acid as an acid, and after mixing to uniformity, 789.8 parts of water was added over a period to make a uniform solution. Reaction between the unreacted isocyanate groups and the water begins from the initial dissolution, but to ensure complete reaction between the unreacted isocyanate groups and the water, the reaction was continued at 20–50° C. for 2–5 hours to yield an aqueous cationic polyurethane resin solution.

The equivalent ratio of NCO/OH at this time was 1.0/0.75.

The weight average molecular weight of the resulting cationic polyurethane resin was 6,400.

The appearance of the aqueous cationic polyurethane resin solution obtained in this manner was a slightly yellowish transparent liquid, and the non-volatile portion was 17.9%.

EXAMPLE 4
(Synthesis by prepolymer method)

Into a nitrogen-purged one-liter 4-necked flask there were charged 84.7 parts of a polyether polyol with a weight average molecular weight of 801 consisting of an addition polymer of bisphenol S and propylene oxide (molar ratio: 1.0/11.0), 10.0 parts of N,N-dimethylformamide and 71.1 parts of hexamethylene diisocyanate, and these were reacted at 70–90° C. for about 2–5 hours to obtain a composition with an NCO content of 16.0%. After cooling to under 50° C., 25.2 parts of N-methyl-N,N-diethanolamine was added to the resulting composition, and further reaction at 70–90° C. for about 2–5 hours yielded a urethane prepolymer with an NCO content of 4.7%. To this urethane prepolymer there was added 21.7 parts of 99% acetic acid as an acid, and after mixing to uniformity, 789.8 parts of water was added over a period to make a uniform solution. Reaction between the unreacted isocyanate groups and the water begins from the initial dissolution, but to ensure complete reaction between the unreacted isocyanate groups and the water, the reaction was continued at 20–50° C. for 2–5 hours to yield an aqueous cationic polyurethane resin solution.

The equivalent ratio of NCO/OH at this time was 1.0/0.75.

The weight average molecular weight of the resulting cationic polyurethane resin was 6,700.

The appearance of the aqueous cationic polyurethane resin solution obtained in this manner was a slightly yellowish hazy liquid, and the non-volatile portion was 18.3%.

EXAMPLE 5
(Synthesis by one-shot method)

Into a nitrogen-purged one-liter 4-necked flask there were charged 68.0 parts of a polyether polyol with a weight average molecular weight of 561 consisting of an addition polymer of bisphenol A and propylene oxide (tradename: Adeca Polyether BPX-33, product of Asahi Electrical Industries, KK.), 28.8 parts of N,N-dimethylformamide and 81.4 parts of hexamethylene diisocyanate, and these were reacted at 70–90° C. for about 2–5 hours to obtain a urethane prepolymer with an NCO content of 5.4%. To this urethane prepolymer there was added 22.0 parts of 99% acetic acid as an acid, and after mixing to uniformity, 789.8 parts of water was added over a period to make a uniform solution. Reaction between the unreacted isocyanate groups and the water begins from the initial dissolution, but to ensure complete reaction between the unreacted isocyanate groups and the water, the reaction was continued at 20–50° C. for 2–5 hours to yield an aqueous cationic polyurethane resin solution.

The equivalent ratio of NCO/OH at this time was 1.0/0.75.

The weight average molecular weight of the resulting cationic polyurethane resin was 7,100.

The appearance of the aqueous cationic polyurethane resin solution obtained in this manner was a slightly white hazy liquid, and the non-volatile portion was 18.0%.

EXAMPLE 6
(Synthesis by prepolymer method)

Into a nitrogen-purged one-liter 4-necked flask there were charged 98.6 parts of a polyether polyol with a weight average molecular weight of 1060 consisting of polypropylene glycol (tradename: Adeca Polyether P-1000, product of Asahi Electrical Industries, KK.), 10.0 parts of N,N-dimethylformamide and 62.5 parts of hexamethylene diisocyanate, and these were reacted at 70–90° C. for about 2–5 hours to obtain a composition with an NCO content of 13.7%. After cooling to under 50° C., 22.1 parts of N-methyl-N,N-diethanolamine was added to the resulting composition, and further reaction at 70–90° C. for about 2–5 hours yielded a urethane prepolymer with an NCO content of 4.0%. To this urethane prepolymer there was added 16.9 parts of 99% acetic acid as an acid, and after mixing to uniformity, 789.8 parts of water was added over a period to make a uniform solution. Reaction between the unreacted isocyanate groups and the water begins from the initial dissolution, but to ensure complete reaction between the unreacted isocyanate groups and the water, the reaction was continued at 20–50° C. for 2–5 hours to yield an aqueous cationic polyurethane resin solution.

The equivalent ratio of NCO/OH at this time was 1.0/0.75.

The weight average molecular weight of the resulting cationic polyurethane resin was 6,800.

The appearance of the aqueous cationic polyurethane resin solution obtained in this manner was a slightly yellowish hazy liquid, and the non-volatile portion was 18.4%.

EXAMPLE 7
(Synthesis by prepolymer method)

Into a nitrogen-purged one-liter 4-necked flask there were charged 96.2 parts of a polyether polyol with a weight average molecular weight of 1020 consisting of polytetramethylene glycol (tradename: PTMG1000, product of Mitsubishi Chemicals, KK.), 10.0 parts of N,N-dimethylformamide and 64.0 parts of hexamethylene diisocyanate, and these were reacted at 70–90° C. for about 2–5 hours to obtain a composition with an NCO content of 14.1%. After cooling to under 50° C., 22.7 parts of N-methyl-N,N-diethanolamine was added to the resulting composition, and further reaction at 70–90° C. for about 2–5 hours yielded a urethane prepolymer with an NCO content of 4.2%. To this urethane prepolymer there was added 17.3 parts of 99% acetic acid as an acid, and after mixing to uniformity, 789.8 parts of water was added over a period to make a uniform solution. Reaction between the unreacted isocyanate groups and the water begins from the initial dissolution, but to ensure complete reaction between the unreacted isocyanate groups and the water, the reaction was continued at 20–50° C. for 2–5 hours to yield an aqueous cationic polyurethane resin solution.

The equivalent ratio of NCO/OH at this time was 1.0/0.75.

The weight average molecular weight of the resulting cationic polyurethane resin was 7,800.

The appearance of the aqueous cationic polyurethane resin solution obtained in this manner was a slightly white transparent liquid, and the non-volatile portion was 17.7%.

EXAMPLE 8
(Synthesis by prepolymer method)

Into a nitrogen-purged one-liter 4-necked flask there were charged 96.7 parts of a polyester polyol with a weight average molecular weight of 1020 consisting of a diol/adipic acid/isophthalic acid condensate (tradename: Adeca Newace YG-108, product of Asahi Electrical Industries, KK.), 10.0 parts of N,N-dimethylformamide and 63.7 parts of hexamethylene diisocyanate, and these were reacted at 70–90° C. for about 2–5 hours to obtain a composition with an NCO content of 14.0%. After cooling to under 50° C., 22.6 parts of N-methyl-N,N-diethanolamine was added to the resulting composition, and further reaction at 70–90° C. for about 2–5 hours yielded a urethane prepolymer with an NCO content of 4.1%. To this urethane prepolymer there was added 17.3 parts of 99% acetic acid as an acid, and after mixing to uniformity, 789.8 parts of water was added over a period to make a uniform solution. Reaction between the unreacted isocyanate groups and the water begins from the initial dissolution, but to ensure complete reaction between the unreacted isocyanate groups and the water, the reaction was continued at 20–50° C. for 2–5 hours to yield an aqueous cationic polyurethane resin solution.

The equivalent ratio of NCO/OH at this time was 1.0/0.75.

The weight average molecular weight of the resulting cationic polyurethane resin was 3,500.

The appearance of the aqueous cationic polyurethane resin solution obtained in this manner was a slightly white transparent liquid, and the non-volatile portion was 18.3%.

EXAMPLE 9
(Synthesis by prepolymer method)

Into a nitrogen-purged one-liter 4-necked flask there were charged 96.7 parts of a polyester polyol with a weight average molecular weight of 1020 consisting of an adipic acid/diethylene glycol condensate (tradename: Adeca Newace F18-62, product of Asahi Electrical Industries, KK.), 10.0 parts of N,N-dimethylformamide and 63.7 parts of hexamethylene diisocyanate, and these were reacted at 70–90° C. for about 2–5 hours to obtain a composition with an NCO content of 14.0%. After cooling to under 50° C., 22.6 parts of N-methyl-N,N-diethanolamine was added to the resulting composition, and further reaction at 70–90° C. for about 2–5 hours yielded a urethane prepolymer with an NCO content of 4.1%. To this urethane prepolymer there was added 17.3 parts of 99% acetic acid as an acid, and after mixing to uniformity, 789.8 parts of water was added over a period to make a uniform solution. Reaction between the unreacted isocyanate groups and the water begins from the initial dissolution, but to ensure complete reaction between the unreacted isocyanate groups and the water, the reaction was continued at 20–50° C. for 2–5 hours to yield an aqueous cationic polyurethane resin solution.

The equivalent ratio of NCO/OH at this time was 1.0/0.75.

The weight average molecular weight of the resulting cationic polyurethane resin was 6,800.

The appearance of the aqueous cationic polyurethane resin solution obtained in this manner was a colorless transparent liquid, and the non-volatile portion was 18.3%.

EXAMPLE 10
(Synthesis by prepolymer method)

Into a nitrogen-purged one-liter 4-necked flask there were charged 95.7 parts of a polycarbonate polyol with a weight average molecular weight of 1001 consisting of a polyhexamethylene carbonate glycol (tradename: Plaxel CD-210, product of F18-62, product of Dicell Chemicals, KK.), 10.0 parts of N,N-dimethylformamide and 64.3 parts of hexamethylene diisocyanate, and these were reacted at 70–90° C. for about 2–5 hours to obtain a composition with an NCO content of 14.2%. After cooling to under 50° C., 22.8 parts of N-methyl-N,N-diethanolamine was added to the resulting composition, and further reaction at 70–90° C. for about 2–5 hours yielded a urethane prepolymer with an NCO content of 4.2%. To this urethane prepolymer there was added 17.4 parts of 99% acetic acid as an acid, and after mixing to uniformity, 789.8 parts of water was added over a period to make a uniform solution. Reaction between the unreacted isocyanate groups and the water begins from the initial dissolution, but to ensure complete reaction between the unreacted isocyanate groups and the water, the reaction was continued at 20–50° C. for 2–5 hours to yield an aqueous cationic polyurethane resin solution.

The equivalent ratio of NCO/OH at this time was 1.0/0.75.

The weight average molecular weight of the resulting cationic polyurethane resin was 6,500.

The appearance of the aqueous cationic polyurethane resin solution obtained in this manner was a slightly white transparent paste, and the non-volatile portion was 17.9%.

EXAMPLE 11
(Synthesis by prepolymer method)

Into a nitrogen-purged one-liter 4-necked flask there were charged 80.2 parts of a polyether polyol with a weight average molecular weight of 561 consisting of an addition polymer of bisphenol A and propylene oxide (tradename: Adeca Polyether BPX-33, product of Asahi Electrical Industries, KK.), 10.0 parts of N,N-dimethylformamide and 60.0 parts of hexamethylene diisocyanate, and these were reacted at 70–90° C. for about 2–5 hours to obtain a composition with an NCO content of 12.0%. After cooling to under 50° C., 34.0 parts of N-methyl-N,N-diethanolamine was added to the resulting composition, and further reaction at 70–90° C. for about 2–5 hours yielded a urethane polymer with terminal hydroxyl groups. To this urethane polymer there was added 26.0 parts of 99% acetic acid as an acid, and after mixing to uniformity, 789.7 parts of water was added over a period to make a uniform solution, yielding an aqueous cationic polyurethane resin solution.

The equivalent ratio of NCO/OH at this time was 1.0/1.2.

The weight average molecular weight of the resulting cationic polyurethane resin was 3,500.

The appearance of the aqueous cationic polyurethane resin solution obtained in this manner was a white cloudy liquid, and the non-volatile portion was 19.3%.

Comparative Example 1
(No addition of waterproofing agent)

Comparative Example 2
(Synthesis by prepolymer method/nonionic)

Into a nitrogen-purged one-liter 4-necked flask there were charged 46.1 parts of a polyether polyol with a weight average molecular weight of 561 consisting of an addition polymer of bisphenol A and propylene oxide (tradename: Adeca Polyether BPX-33, product of Asahi Electrical Industries, KK.), 10.0 parts of N,N-dimethylformamide and 55.2 parts of hexamethylene diisocyanate, and these were reacted at 70–90° C. for about 2–5 hours to obtain a composition with an NCO content of 18.6%. After cooling to under 50° C., 98.6 parts of polyethylene glycol with a weight average molecular weight of 600 consisting of PEG600 (product of Sanyo Chemicals, KK.) was added to the resulting composition, and further reaction at 70–90° C. for about 2–5 hours yielded a urethane prepolymer with an NCO content of 3.3%. To this urethane prepolymer there was added 790.0 parts of water over a period to make a uniform solution. Reaction between the unreacted isocyanate groups and the water begins from the initial dissolution, but to ensure complete reaction between the unreacted isocyanate groups and the water, the reaction was continued at 20–50° C. for 2–5 hours to yield an aqueous nonionic polyurethane resin solution.

The equivalent ratio of NCO/OH at this time was 1.0/0.75.

The weight average molecular weight of the resulting nonionic polyurethane resin was 5,200.

The appearance of the aqueous nonionic polyurethane resin solution obtained in this manner was a colorless transparent liquid, and the non-volatile portion was 19.6%.

Comparative Example 3
(Synthesis by prepolymer method/anionic)

Into a nitrogen-purged one-liter 4-necked flask there were charged 84.5 parts of a polyether polyol with a weight average molecular weight of 561 consisting of an addition polymer of bisphenol A and propylene oxide (tradename: Adeca Polyether BPX-33, product of Asahi Electrical Industries, KK.), 10.0 parts of N,N-dimethylformamide and 63.3 parts of hexamethylene diisocyanate, and these were reacted at 70–90° C. for about 2–5 hours to obtain a composition with an NCO content of 12.0%. After cooling to under 50° C., 44.6 parts of 2,2-dimethylolbutanoic acid was added to the resulting composition, and further reaction at 70–90° C. for about 2–5 hours yielded a urethane polymer with terminal hydroxyl groups. To this urethane polymer there was added 30.8 parts of 25% ammonia as a base, and after mixing to uniformity, 766.9 parts of water was added over a period to make a uniform solution, yielding an aqueous anionic polyurethane resin solution.

The equivalent ratio of NCO/OH at this time was 1.0/1.2.

The weight average molecular weight of the resulting anionic polyurethane resin was 3,800.

The appearance of the aqueous anionic polyurethane resin solution obtained in this manner was a colorless transparent liquid, and the non-volatile portion was 19.6%.

Treatment With Waterproofing Agent for Ink Jet Printing Paper

Ink jet printing paper was prepared by treatment in the following manner using the compositions of Examples 1–11 and Comparative Examples 1–3 as ink jet printing paper waterproofing agents and using common wood free paper.

The non-volatile portion of each of the aqueous cationic polyurethane resin solutions of the aforementioned examples was adjusted to 2% to prepare a treatment bath, and a wood free paper was immersed therein for one minute. After one minute it was drawn out of the treatment bath, the excess treatment solution was removed from the front and back, and drying was performed with a calender at 105° C. for 90 seconds. Thus was prepared ink jet printing paper coated with about 1 part by weight of the cationic polyurethane resin in terms of non-volatile portion to 100 parts by weight of the wood free paper. (The coating amount of the polyurethane resin was approximately 0.7 g/m$^2$.) Exactly the same treatment was performed for the comparative examples.

Performance Evaluation

The ink jet printing paper treated in the manner described above was evaluated on the following criteria, and the results are shown in Table 1.

[Water Resistance Evaluation Test]

Ink jet printing paper which had been solid printed with BLACK, CYAN, MAGENTA and YELLOW single colors using an Epson (MJ-700V2C) ink jet printer was allowed to stand for one hour and then dipped in running water for 5 minutes and dried at 105° C. for 90 seconds, upon which the solid printing concentration before and after treatment were compared and the residual optical density was determined, to evaluate the water resistance. The optical density was measured with a MacBeth densitometer RD-918. Higher values are better, with 100% indicating absolutely no change.

[Color Tone Evaluation Test]

Ink jet printing paper which had been solid printed with BLACK, CYAN, MAGENTA and YELLOW single colors using an Epson (MJ-700V2C) ink jet printer was visually examined, and the color tone was evaluated based on the following standards.

o—virtually no change

Δ—some color change x—clear color change

[Blank Yellowing Evaluation Test]

Ink jet printing paper was allowed to stand at 20° C., 65% RH for one month, and the yellowing of the blank areas of the ink jet printing paper before and after treatment was visually examined and evaluated on the following standards.
- ○—virtually no change
- Δ—some color change
- ×—clear color change

[Ink Blotching Evaluation Test]

Vertical and horizontal normal lines were drawn with a drafting pipe pen (product of Reutling, West Germany) according to the J.TAPPI paper pulp testing method No.12-76, and were evaluated based on a series of ink writing size testing standard blotch samples, for an ink blotching evaluation test. The series consists of 6 levels, with level 6 as good and level 1 as poor.

TABLE 1

| | Water resistance (%) | | | | Color tone | Blank yellowing | Ink blotching |
|---|---|---|---|---|---|---|---|
| | black | cyan | magenta | yellow | | | |
| Ex.1 | 98 | 94 | 60 | 95 | ○ | ○ | 4–5 |
| Ex.2 | 96 | 94 | 58 | 95 | ○ | ○ | 4 |
| Ex.3 | 96 | 93 | 58 | 94 | ○ | ○ | 4–5 |
| Ex.4 | 96 | 92 | 57 | 95 | ○ | ○ | 4 |
| Ex.5 | 95 | 94 | 55 | 95 | ○ | ○ | 4 |
| Ex.6 | 93 | 95 | 56 | 90 | ○ | ○ | 4 |
| Ex.7 | 91 | 94 | 50 | 90 | ○ | ○ | 4 |
| Ex.8 | 86 | 92 | 54 | 91 | ○ | ○ | 4 |
| Ex.9 | 90 | 91 | 57 | 91 | ○ | ○ | 4 |
| Ex.10 | 85 | 91 | 58 | 88 | ○ | ○ | 4 |
| Ex.11 | 80 | 89 | 50 | 87 | ○ | ○ | 4 |
| Comp. Ex. 1 | 64 | 53 | 40 | 83 | × | ○ | 3 |
| Comp. Ex. 2 | 67 | 61 | 44 | 85 | × | ○ | 3 |
| Comp. Ex. 3 | 65 | 60 | 41 | 85 | × | ○ | 3 |

As shown in Table 1, the compositions of Examples 1–11 of the invention exhibited satisfactory water resistance, blank yellowing resistance and ink blotching resistance. In particular, those of Examples 1 to 4 exhibited much better water resistance than those of Examples 5 to 11.

What is claimed is:

1. A waterproofing agent for ink jet printing paper which comprises an aqueous cationic polyurethane resin solution prepared by dispersing or dissolving in water one or more cationic polyurethane resins obtained by neutralizing with acid or quaternizing with a quarternizing agent part or all of the tertiary amino groups of a polyurethane molecule obtained by isocyanate polyaddition reaction of the following compounds (A), (B) and (C):
   (A) a polyol with at least 2 active hydrogen atoms which can react with isocyanate groups and with a weight average molecular weight of 300–5000,
   (B) a diol, triol, diamine or triamine compound with a tertiary amino group and a weight average molecular weight of less than 300, and
   (C) an organic isocyanate with at least 2 isocyanate groups; and
   wherein the isocyanate polyaddition reaction of said compounds of (A), (B) and (C) is carried out in a ratio of equivalents of isocyanate groups in (C) to total equivalents of hydroxyl groups and primary amino groups in (A) and (B) of 1.0/1.0–1.0/0.5, followed by reaction of the unreacted isocyanate groups with water in the presence of water in an amount of not less than 220 parts by weight per 100 parts by weight of the cationic polyurethane resins.

2. A waterproofing agent according to claim 1, wherein said polyol of (A) is selected from polyester polyols, polyether polyols, polycarbonate polyols, polyacetal polyols, polyacrylate polyols, polyesteramide polyols and polythioether polyols.

3. A waterproofing agent according to claim 1, wherein said polyol of (A) is a polymer obtained by addition polymerization of one or more monomers selected from ethylene oxide, propylene oxide, butylene oxide, styrene oxide, epichlorohydrin, tetrahydrofuran and cyclohexylene, using as the initiator a compound with at least 2 primary amino groups, selected from ethylenediamine and propylene diamine.

4. A waterproofing agent according to claim 1, wherein said organic isocyanate compound of (C) is selected from 2,4-tolylene diisocyanate, 2,6-tolylene diisocyanate, m-phenylene diisocyanate, p-phenylene diisocyanate, 4'4-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, xylylene diisocyanate, tetramethylxylylene diisocyanate, hydrogenated xylylene diisocyanate, lysine diisocyanate, isophorone diisocyanate and 4,4'-dicyclohexylmethane diisocyanate.

5. A waterproofing agent according to claim 1, wherein the ratio of the equivalents is 1.0/0.9–1.0/0.5.

6. A waterproofing agent according to claim 1, including a tin-based catalyst and/or an amine-based catalyst for reducing the production time for the polyaddition reaction.

7. A waterproofing agent according to claim 6, wherein said tin-based catalyst is selected from dibutyltin dilaurate and stannous octoate.

8. A waterproofing agent according to claim 6, wherein said amino-based catalyst is selected from the triethylenediamine, triethylamine, tetramethylpropanediamine, tetramethylbutanediamine and N-methylmorpholine.

9. A waterproofing agent according to claim 1, wherein the isocyanate polyaddition reaction is carried out using as the reaction solvent a hydrophilic organic solvent which does not directly contribute to the isocyanate polyaddition reaction system, for control of the reaction system or control of the base viscosity.

10. A waterproofing agent according to claim 9, wherein said hydrophilic organic solvent is selected from the group consisting of acetone, methyl ethyl ketone, methyl isobutyl ketone diisobutyl ketone, and organic acid esters.

11. A waterproofing agent according to claim 1, which is obtained by dispersing or dissolving in water a cationic polyurethane resin obtained by the neutralization with acid or the quaternization with a quaternizing agent a portion or all of the tertiary amino groups in the polyurethane molecule obtained by the polyaddition reaction of said compounds (A), (B) and (C), prior to the reacting the unreacted isocyanate groups with water.

12. A waterproofing agent according to claim 11, wherein a hydrophilic organic solvent is added as a diluting solvent to the waterproofing agent for ink jet printing paper after reacting between the unreacted isocyanate groups and the excess water.

13. A coating for plain paper comprising a waterproofing agent according to claim 1, wherein the amount of coating of the waterproofing agent is 0.1–10.0 g/m² in terms of the cationic polyurethane resin.

14. A method of coating plain paper for use as ink jet printing paper for the waterproofing thereof comprising mixing the waterproofing agent according to claim 1 with pulp fiber for sheet making.

15. A method of coating plain paper for use as ink jet printing paper for the waterproofing thereof according to claim 14, comprising impregnating the paper with a treatment solution and removing excess impregnating solution from the front and back of the paper.

16. A waterproofing agent according to claim 1, wherein said compound of (B) is a compound represented by the following general formula:

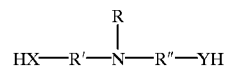

wherein X and Y may be the same or different and each represent —NH— or —O—, R represents an alkyl group, alkanol group or aminoalkyl group of 1–4 carbon atoms, and R' and R" may be the same or different and each represent an alkylene group of 1–4 carbon atoms.

17. A waterproofing agent according to claim 10, wherein said hydrophilic organic solvent is selected from the group consisting of methyl formate, ethyl formate, propyl formate, butyl acetate, methyl proprionate, ethyl propionate and butyl N-methylpyrrolidone.

* * * * *